(12) United States Patent
Pham et al.

(10) Patent No.: US 6,628,000 B1
(45) Date of Patent: Sep. 30, 2003

(54) TECHNIQUES FOR MAINTAINING PARALLELISM BETWEEN OPTICAL AND CHIP SUB-ASSEMBLIES

(75) Inventors: Ken Pham, San Jose, CA (US); Jia Liu, San Jose, CA (US); Luu Thanh Nguyen, Sunnyvale, CA (US); William Paul Mazotti, San Martin, CA (US); Bruce Carlton Roberts, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 96 days.

(21) Appl. No.: 10/006,443

(22) Filed: Nov. 19, 2001

(51) Int. Cl.[7] .............................................. H01L 23/544
(52) U.S. Cl. ...................... 257/797; 257/666; 257/432; 438/65; 438/111
(58) Field of Search .................... 257/797, 666, 257/787, 432, 433; 438/65, 69, 27, 29, 111, 401; 385/88, 92, 94

(56) References Cited

U.S. PATENT DOCUMENTS 6,351,027 B1 * 2/2002 Goboney et al.
6,467,972 B2 * 10/2002 Setoguchi
6,504,107 B1 * 1/2003 Kragl
6,504,177 B2 * 1/2003 Kawano
6,508,595 B1 * 1/2003 Chan et al.

* cited by examiner

Primary Examiner—Sheila V. Clark
(74) Attorney, Agent, or Firm—Beyer Weaver & Thomas, LLP

(57) ABSTRACT

Techniques for maintaining the optical coupling efficiency between photonic devices of an optoelectronic module and its interconnecting optical fibers are described. The techniques ensure that the mating surfaces of an optical sub-assembly and a chip sub-assembly remain planar to each other throughout and after the soldering process of the optoelectronic manufacturing process. These techniques include the use of a ceramic fixture made of a stack of plates having openings that secure the orientation of the optical and chip sub-assemblies. The fixture can have one or more openings to secure a respective one or more combination of optical and chip sub-assemblies. A high temperature tape can also be used to maintain the parallelism between the optical and chip sub-assemblies. An optical sub-assembly having pedestals on its bottom surface can also be use to maintain parallelism of the optical and chip sub-assemblies. Methods of using each technique is also described.

29 Claims, 12 Drawing Sheets

FIG. 5 (Plate 1)

FIG. 6 (Plate 2)

(Plates 3 & 5)

(Plates 3 & 5)

FIG. 9 (Plates 4 & 6)

TECHNIQUES FOR MAINTAINING PARALLELISM BETWEEN OPTICAL AND CHIP SUB-ASSEMBLIES

CROSS-REFERENCE TO RELATED APPLICATIONS

This application is related to U.S. patent application Ser. No. 09/922,358, filed Aug. 3, 2001, entitled "MINIATURE SEMICONDUCTOR PACKAGE FOR OPTO-ELECTRONIC DEVICES," U.S. patent application Ser. No. 09/922,598, entitled "TECHNIQUES FOR JOINING AN OPTO-ELECTRONIC MODULE To A SEMICONDUCTOR PACKAGE," filed on Aug. 3, 2001, U.S. patent application Ser. No. 09/922,601, filed Aug. 3, 2001, entitled "OPTICAL SUB-ASSEMBLY FOR OPTO-ELECTRONIC MODULES," and U.S. patent application Ser. No. 10/165,711, filed JUN. 6, 2002, entitled "CERAMIC OPTICAL SUB-ASSEMBLY FOR OPTO-ELECTRONIC MODULES," the content of which is hereby incorporated by reference.

FIELD OF THE INVENTION

The present invention relates generally to optoelectronic modules, and more specifically to techniques for maximizing optical coupling efficiency.

BACKGROUND OF THE INVENTION

Much of the computer and communication networks being built today, including the Internet, are using fiber optic cabling. Fiber optic cabling data is transmitted using light signals, not electrical signals. For example, a logical one may be represented by a light pulse of a specific duration and a logical zero may be represented by the absence of a light pulse for the same duration. Since light is attenuated less in fiber than electrons traveling through copper, and multiple data streams can be transmitted at one time, the bandwidth of optic fiber is significantly greater than copper. Currently, networks continue to use fiber optics for transmitting data between nodes and silicon chips to process the data within nodes. Fiber optic transceivers, which convert light signals from a fiber optic cable into electrical signals, and vice versa, are used as the interface between a fiber optic line and a computer node.

FIG. 1 illustrates a perspective view of one example of an optoelectronic module 100 that can be used as an optical transceiver. Optoelectronic module 100 includes optical sub-assembly 102, which is mounted on top of chip sub-assembly 104. Optical sub-assembly 102 includes support block 103, which supports photonic devices 106 (laser emitters and light detectors). Chip sub-assembly 104 contains embedded semiconductor driver chip(s) and up-linking contacts on its top surface, which provides an electrical pathway to connect the semiconductor driver chip(s) to photonic devices 106. Electrical contact surfaces on the bottom surface of support block 103 can be connected to the up-linking contacts of chip sub-assembly 104 through a number of methods that include, for example, wire-stud bond with solder or conductive glue, wire-stud bond with anisotropic adhesive film, or solder. The remaining gap between optical sub-assembly 102 and chip sub-assembly 104 is filled with underfill material 105. Electrical traces on or in support block 103 connect photonic devices 106 to the electrical contact surfaces of support block 103. Optical fibers 108 are optically coupled to photonic devices 106 using various securing mechanisms (not shown). In the embodiment shown in FIG. 1, chip sub-assembly 104 is a Leadless Leadframe Package (LLP) having electrical contacts 110, which facilitate the connection of the module 100 to a substrate such as a printed circuit board. For more information regarding the optoelectronic module 100, refer to U.S. patent application Ser. No. 10/165,553 and U.S. patent application Ser. No. 10/165,711.

FIG. 2 illustrates a cross-sectional view of optoelectronic module 100 along line 2—2 of FIG. 1. FIG. 2 shows that the electrical contacts on the bottom surface of OSA 102 are connected to the up-linking contacts of CSA 104 with solder balls 112. The relative orientation of OSA 102 and CSA 104 is shown to be in the most optimal configuration wherein the bottom surface of OSA 102 and the top surface of CSA 104 are parallel to each other. In this configuration, the mounted photonic devices 106 can be placed as close as possible to the optical fibers 108 for optimal optical coupling efficiency. Any misalignment and/or angular rotation in one of the sub-components (e.g., photonics, fiber ribbon, connector, OSA, etc.) will increase optical loss and adversely impact the module performance.

Unfortunately, optimal parallelism between OSA 102 and CSA 104 is not relatively easy to achieve. FIG. 3 illustrates a cross-sectional view of optoelectronic module 100 of FIG. 1 in the situation where parallelism between OSA 102 and CSA 104 is lost. The loss of parallelism is due, in part, to the fact that the current design of optoelectronic module 100 has the up-linking contacts of CSA 104 located near the forward edge (right side) of OSA 102. As a result, the connecting region is off the center of gravity of OSA 102. The imbalance can result in tilting of OSA 102 as shown in FIG. 3, where the left side of OSA 201 sinks into underfill 105 and solder balls 112 come to have different heights. The tilting of OSA 102 causes the loss of optical coupling efficiency and also can cause solder balls 112 to make contact with each other, thereby resulting in faulty electrical connections.

In view of the foregoing, a technique for maintaining the optical coupling efficiency between photonic devices of an optoelectronic module and its interconnecting optical fibers would be desirable.

BRIEF SUMMARY OF THE INVENTION

The present invention pertains to techniques for maintaining the optical coupling efficiency between photonic devices of an optoelectronic module and its interconnecting optical fibers. The techniques ensure that the mating surfaces of an optical sub-assembly and a chip sub-assembly remain parallel with respect to each other throughout the soldering process of the optoelectronic manufacturing process.

One aspect of the invention pertains to a fixture used during the process of attaching an optical sub-assembly to a chip sub-assembly that includes a chip sub-assembly capture plate having a chip sub-assembly slot configured to support and secure the chip sub-assembly in a fixed orientation and having a set of index holes, and an optical sub-assembly capture plate having an optical sub-assembly slot configured to align and maintain the relative orientation between the optical sub-assembly and a chip sub-assembly such that the bottom surface of the optical sub-assembly and the top surface of the chip sub-assembly are substantially parallel.

Another aspect of the invention pertains to an optoelectronic manufacturing system that includes a molded leadframe panel that includes a metal leadframe panel that supports a molded resin panel, the molded resin panel containing an embedded array of chip sub-assemblies, and a fixture panel mounted on top of the molded leadframe panel. The fixture panel includes a first optical sub-assembly securing plate having a plurality of openings configured to fit around the perimeter of a respective optical sub-assembly, and a second optical sub-assembly securing plate having a plurality of openings configured to fit around the perimeter of a respective optical sub-assembly at a region above the first optical sub-assembly securing plate.

Another aspect of the present invention pertains to a method for maintaining the relative orientation between an optical sub-assembly and a chip sub-assembly during assembly. The method comprises providing a chip sub-assembly capture plate having a chip sub-assembly slot, inserting a chip sub-assembly into the chip sub-assembly slot, the chip sub-assembly slot configured to support and secure the chip sub-assembly in a fixed orientation, providing an optical sub-assembly capture plate having an optical sub-assembly slot, inserting an optical sub-assembly into the optical sub-assembly slot, the chip and optical sub-assembly capture plates cooperatively configured to align and maintain the relative orientation between the optical sub-assembly and a chip sub-assembly such that the bottom surface of the optical sub-assembly and the top surface of the chip sub-assembly are substantially parallel, and placing the combination of the chip and optical sub-assembly capture plates and the chip and optical sub-assemblies into a reflow oven to undergo a reflow process.

Another aspect of the invention pertains to an optoelectronic module that includes a chip sub-assembly, an optical sub-assembly, and a high-temperature tape positioned on the top surface of the molded resin package and supporting at least a portion of the bottom surface of the optical sub-assembly such that the bottom surface of the optical sub-assembly and the top surface of the molded resin package are substantially parallel.

Another aspect of the invention pertains to a semiconductor leadframe panel that includes an electrically conductive substrate having a molded resin panel formed thereon, an array of semiconductor dice encapsulated within the molded resin panel, the top surface of each semiconductor die supporting at least one up-linking contact such that an up-linking contact surface of each up-linking contact is exposed through a top surface of the molded resin panel, and a plurality of high-temperature tape strips adhered to the top surface of the molded resin panel and positioned adjacent to each row of up-linking contact surfaces. A method for using the high temperature tape with a leadframe panel is also described.

Yet another aspect of the invention pertains to an optoelectronic module that includes a semiconductor chip sub-assembly having a top surface that includes a plurality of up-linking contact surfaces, and a support block having at least one pedestal extending from the bottom surface of the support block, the pedestal configured to support the support block in an orientation in which the bottom surface of the support block is substantially parallel with the top surface of the chip sub-assembly.

These and other features and advantages of the present invention will be presented in more detail in the following specification of the invention and the accompanying figures, which illustrate by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known operations have not been described in detail so not to unnecessarily obscure the present invention.

The present invention pertains to techniques for maintaining the optical coupling efficiency between photonic devices of an optoelectronic module and its interconnecting optical fibers. The techniques ensure that the mating surfaces of an optical sub-assembly and a chip sub-assembly remain planar to each other throughout and after the soldering process of the optoelectronic manufacturing process. The techniques include the use of a reflow support fixture, high-temperature tape, and pedestals on optical sub-assemblies. Each of these techniques will now be described below.

Figure 1:
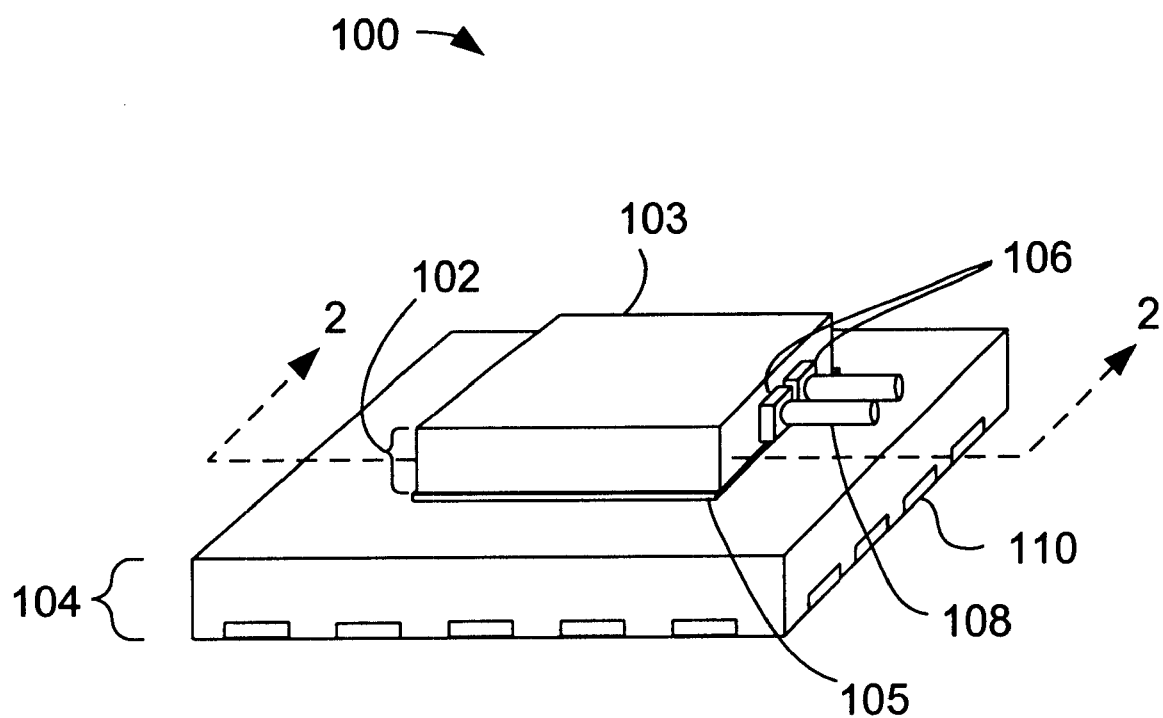
FIG. 1 illustrates a perspective view of one example of an optoelectronic module that can be used as an optical transceiver.
Figure 2:
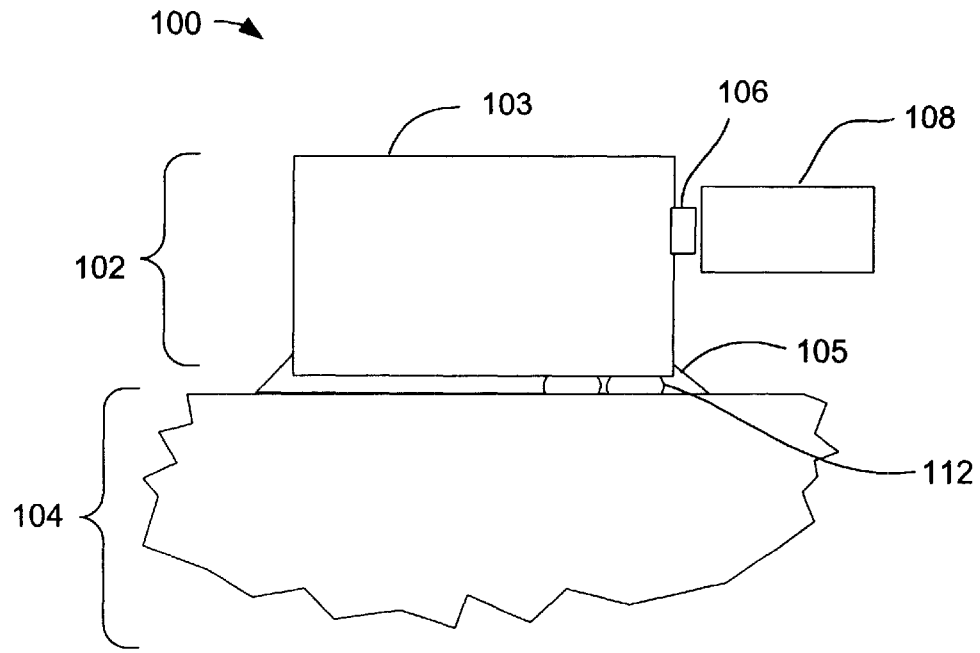
FIG. 2 illustrates a cross-sectional view of optoelectronic module along line 2—2 of FIG. 1.
Figure 3:
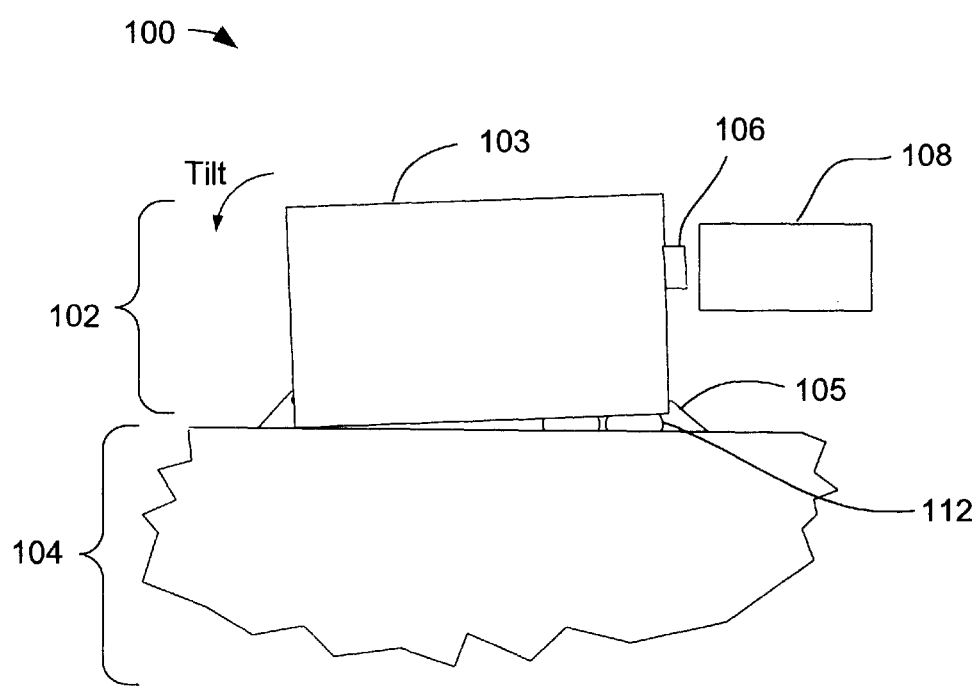
FIG. 3 illustrates a cross-sectional view of optoelectronic module of FIG. 1 in the situation where parallelism between OSA and CSA is lost.
Figure 4:
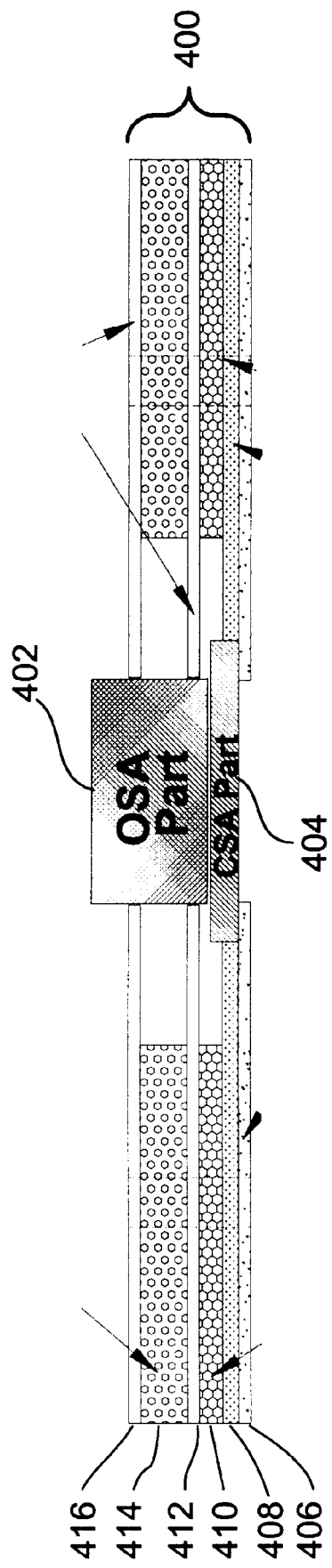
FIG. 4 illustrates a side plan, cross-sectional view of reflow support fixture, which is shown to be securing OSA and CSA.

The reflow support fixture will first be described. FIG. 4 illustrates a side plan, cross-sectional view of reflow support fixture 400, which is shown to be securing OSA 402 and CSA 404. Fixture 400 is a stack of plates that each have an opening for either OSA 402 or CSA 404. Each of the plates are designated as (from bottom to top): plate 1, 406; plate 2, 408; plate 3, 410; plate 4, 412; plate 5, 414; and, plate 6, 416. CSA 404 is based on the leadless leadframe package (LLP) configuration, but it can be any semiconductor package form factor.

As mentioned earlier, the purpose of fixture 400 is to secure OSA 402 and CSA 404 in a fixed orientation throughout a process of soldering OSA 402 to CSA 404. OSA 402 and CSA 404 combine to form an optoelectronic module. During the soldering process, the entire fixture 400 and the secured OSA and CSA are placed into a solder reflow oven. To minimize thermal expansion and contraction, which could adversely affect the desired orientation between the OSA and CSA, the plates of fixture 400 are preferably formed of ceramic. The low coefficient of thermal expansion for ceramic materials minimizes structural expansion and contraction of the fixture and thereby maximizes the stability of OSA and CSA throughout the reflow process. Also preferably, the ceramic used is at least 96% pure alumina.

FIGS. 5–8 are now discussed to further describe each of the individual plates of fixture 400.

Figure 5:
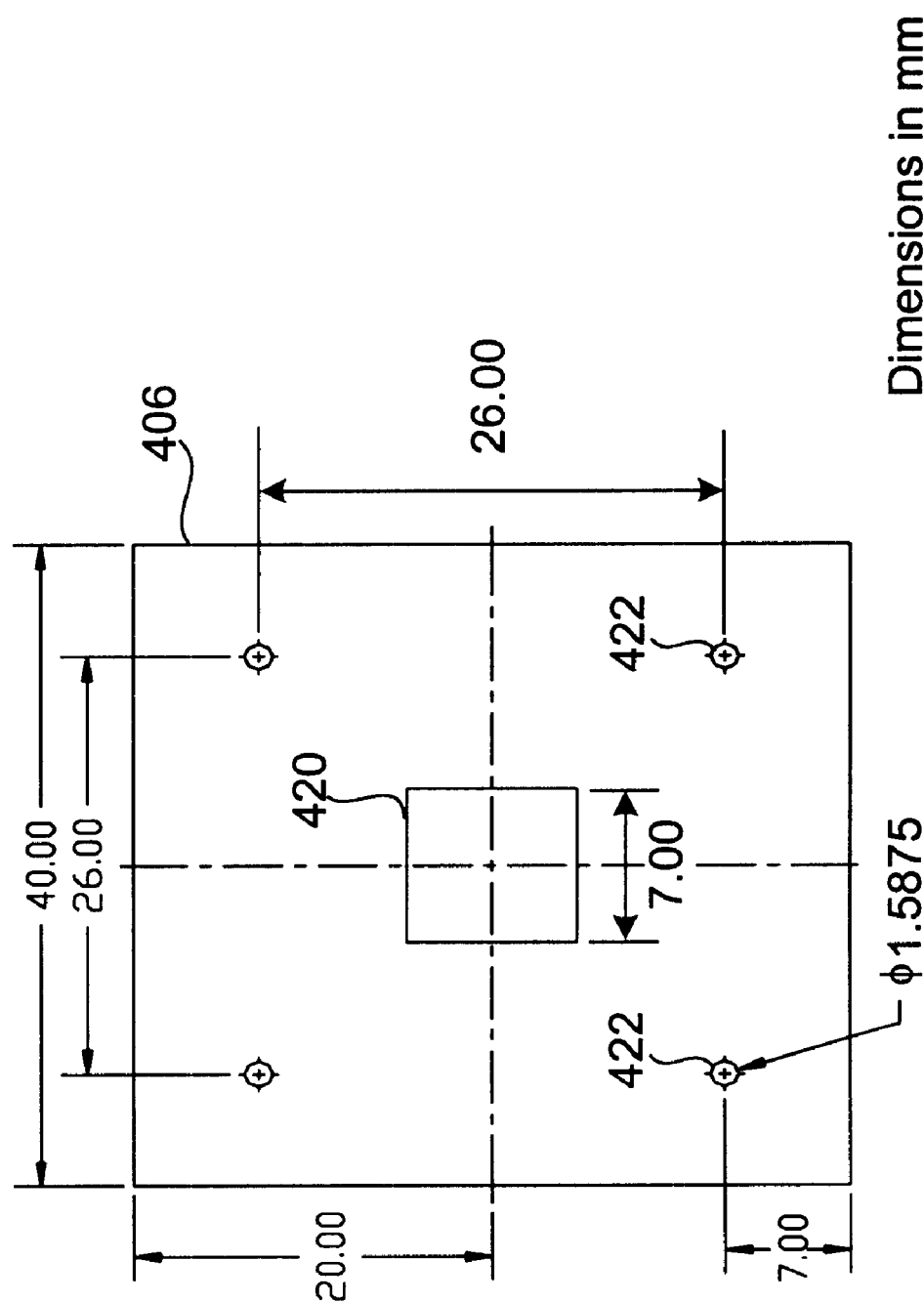
FIG. 5 illustrates a plan view of plate 1.

FIG. 5 illustrates a plan view of plate 1, 406. Plate 1, 406 serves to support the bottom surface of CSA 404. Plate 1, 406 has an opening 420 over which CSA's are positioned such that when fixture 400 is placed in a reflow oven, the bottom surface of CSA 404 is exposed through the fixture for more thorough heating. The opening 420 in plate 1, 406 and in the other plates are formed to provide more thorough convection heating of the optoelectronic module so that the solder material connecting the OSA and CSA can be properly reflowed. In an alternative embodiment of plate 1, 406, opening 420 can have various shapes so long as portions of plate 1, 406 are configured to support the bottom surface of CSA 404. For example, opening 420 can have an oval or circular shape.

Plate 1, 406 has four alignment holes 422 that are aligned with respective alignment holes in the other layers so that each of the plates forming fixture 406 can be properly aligned and then clamped together. It is possible to have a variety of number of alignment holes 422 rim so long as proper alignment of the various plates can be obtained. For instance, three alignment holes in a triangular arrangement can also be formed in the plates of fixture 400. The arrangement of alignment holes 422 should match the alignment holes of the other plates so that they can be secured to each other. FIG. 5 shows respective dimensions, in millimeters, of plate 1, 406 according to one embodiment of the invention. Alignment holes 422 are shown to have diameters of 1.5875 mm.

Figure 6:
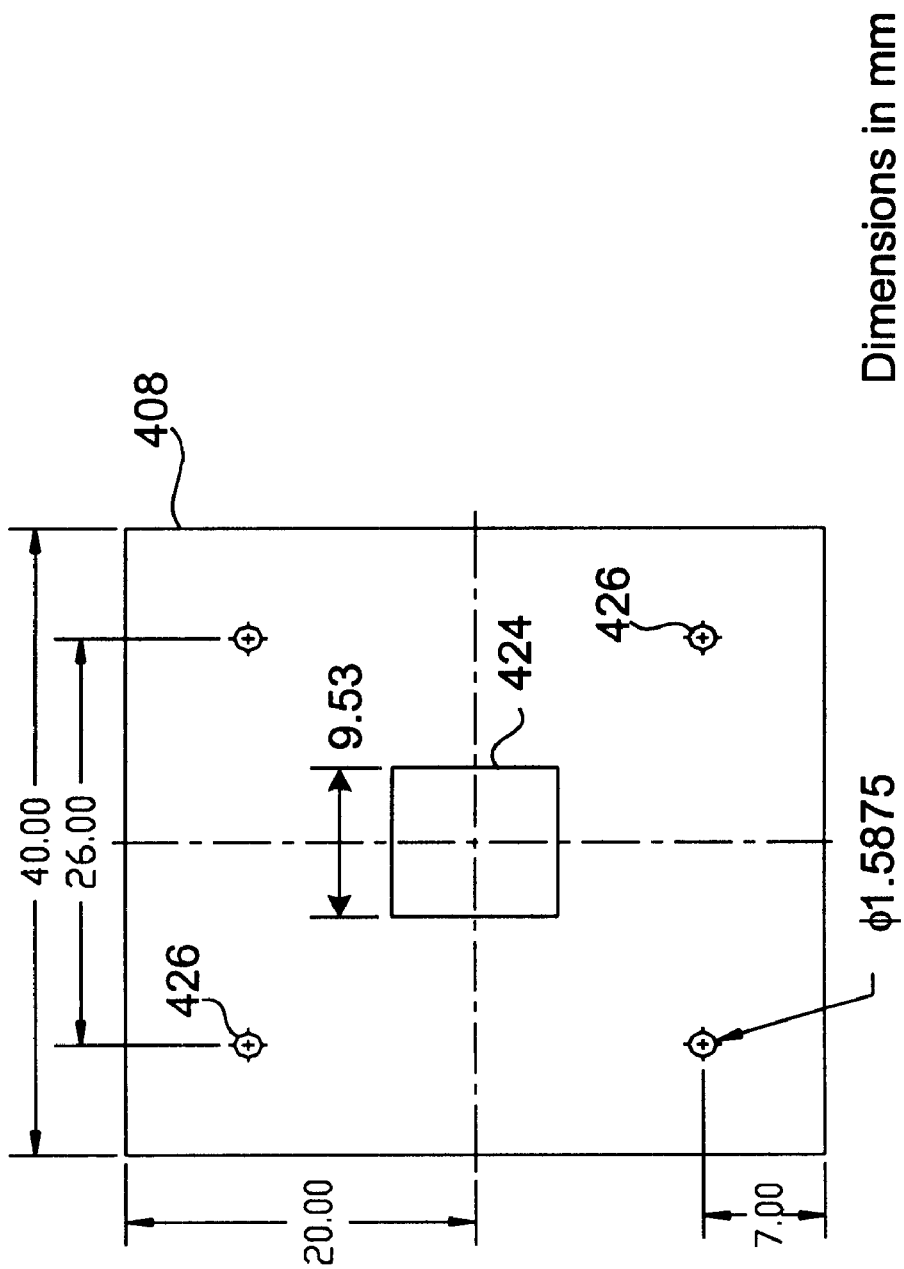
FIG. 6 illustrates a plan view of plate 2.

FIG. 6 illustrates a plan view of plate 2, 408. Plate 2 can also be referred to as a CSA securing or capture plate. Plate 2, 408 serves to secure CSA 404 in a fixed position within fixture 400. CSA 404 is secured by opening 424 of plate 2, 408, which fits around the perimeter of CSA 404. In alternative embodiments of plate 2, 408 (and of plate 4 and 6), opening 424 can have an outline other than a rectangle. For example, each edge of opening 424 can have uniform length stems that can secure CSA 404 in position. Such stems can be advantageous in that less ceramic material would surround CSA 404 and thereby facilitate increased convection heating. Four alignment holes 426 are positioned on plate 2, 408 such that they align with alignment holes 422 of plate 1, 406. Once again, respective dimensions in millimeters are shown in FIG. 6. In an alternative embodiment of the invention, plates 1 and 2 can be formed from a single piece of ceramic.

Figure 7:
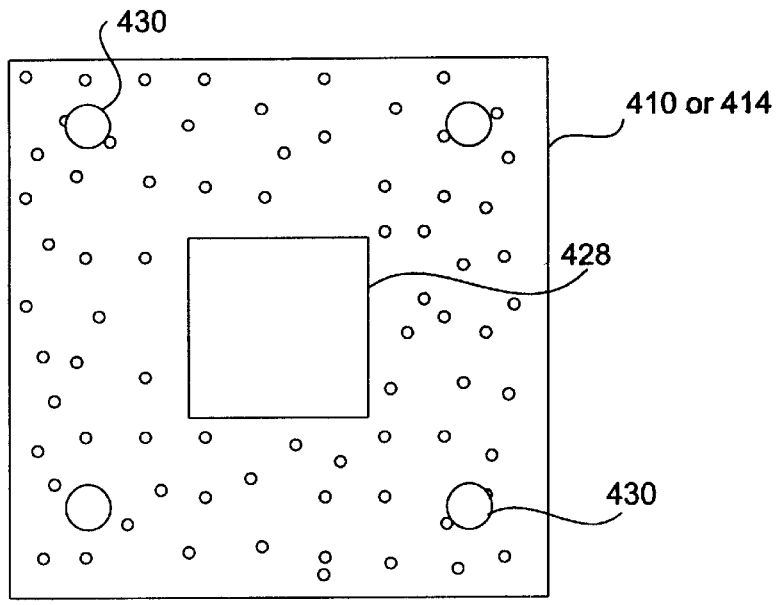
FIG. 7 illustrates a plan view of plates 3 and 5, respectively.

FIG. 7 illustrates a plan view of plates 3 and 5, 410 and 414, respectively. Plates 3 and 5 serve to maintain spacing between plates 2, 4 and 6. Plates 3 and 5 are similar in that they are porous plates with large openings 428 that are larger than both the CSA 404 and the OSA 402. The large opening 428 and the porosity of plates 3 and 5 facilitate the convection heating of the CSA 404 and OSA 402 within a reflow oven. The large size of opening 428 leaves open space around either the CSA 404 or the OSA 402 and allows more heat energy to be absorbed by the OSA and CSA rather than the ceramic plate material. Plates 3 and 5 can have different sized openings 428. The thickness of each plate 3, 410 and plate 5, 414 can vary in order to obtain proper spacing between plates 2 and 4, and between plates 4 and 6. Plate 5, 414 should be thick enough so that plates 4 and 6 are sufficiently spaced apart to secure OSA 402 such that it does not rotate about its center of gravity. Alignment holes 430 are positioned to align with the alignment holes of the other plates of fixture 400.

Figure 8:
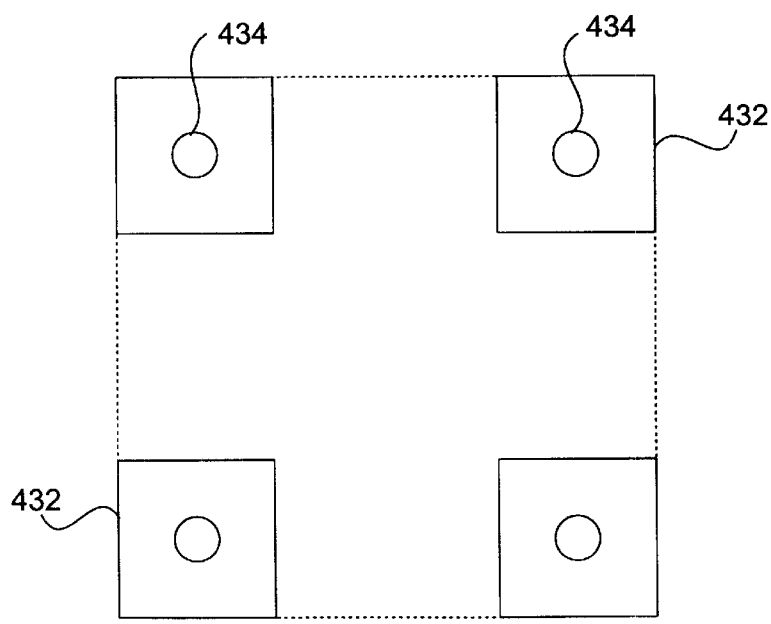
FIG. 8 illustrates an alternative embodiment of plates 3 and 5, respectively.

FIG. 8 illustrates an alternative embodiment of plates 3 and 5, 410 and 414, respectively. In this alternative embodiment, plates 3 and 5 are actually only four small plates 432 positioned at each corner where the OSA or CSA is to be secured. Each of the small plates 432 serves to space apart plates 2, 4, and 6. In this embodiment, a large amount of open space is provided about OSA or CSA for increased convection heating capabilities. Each of the small plates 432 can be placed in various locations in the plane in which either plate 3 or 5 lies so long as a uniform spacing between surrounding layers can be achieved. Alignment holes 434 are located in each of the small plates 432.

Figure 9:
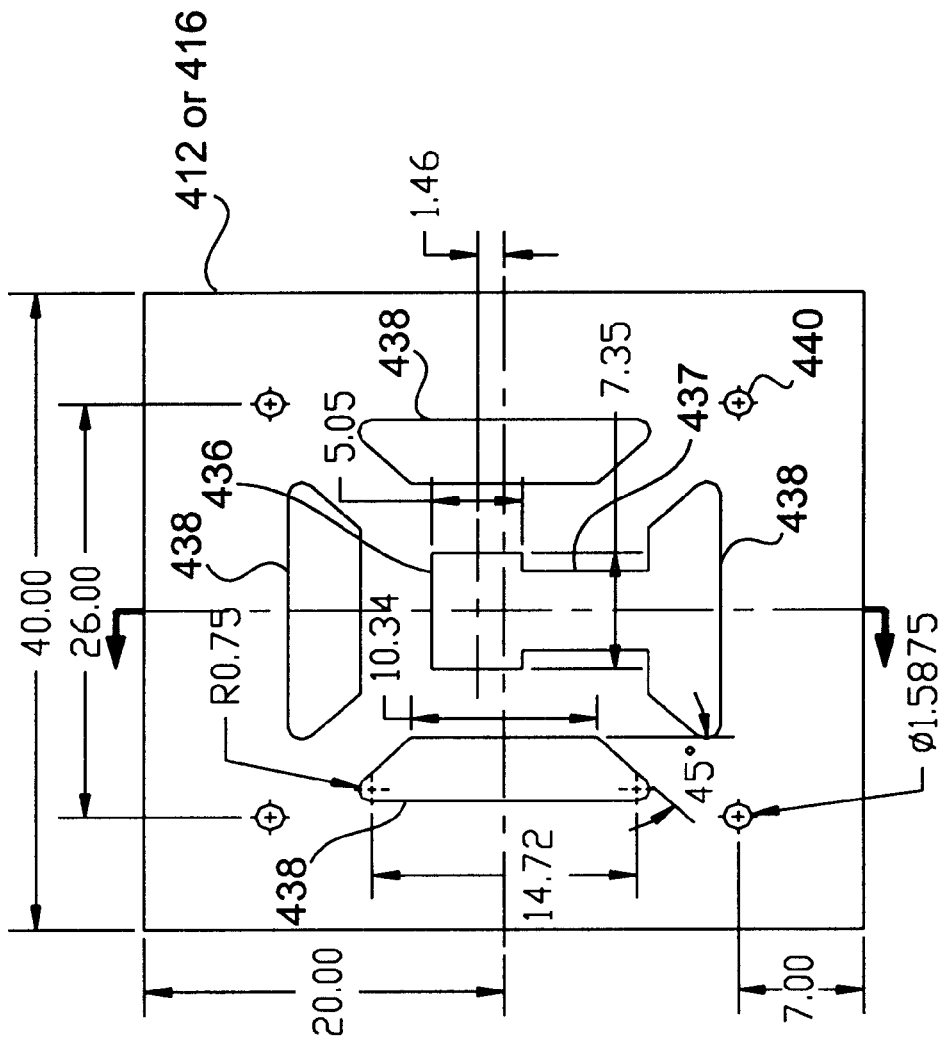
FIG. 9 illustrates a plan view of plates 4 and 6, respectively.

FIG. 9 illustrates a plan view of plates 4 and 6, 412 and 416, respectively. Plates 4 and 6 can also be referred to as OSA securing or capture plates. Layers 4 and 6 serve to secure OSA 402 in a co-planar or parallel orientation with respect to CSA 404. Once again, coplanar and "parallel" orientation refer to the orientation where the bottom surface of OSA 402 and the top surface of CSA 404 are parallel to each other. The opening 436 of layers 4 and 6 secure OSA 402 by making contact with the outer perimeter of OSA 402. The vertical separation between plates 4 and 6 allows the plates to make contact with OSA 402 along different height locations on OSA 402. This allows plates 4 and 6 to effectively prevent rotation of OSA 402 with respect to CSA 404.

A lengthwise opening 437 extends from one edge of opening 436 to the edge of one of openings 438. Openings 438 can also be referred to as ventilation openings. Opening 437 provides open space for the photonic device attached to a side surface of OSA 402 to fit, unobstructed, within fixture 400. In alternative embodiments, opening 437 needs to be only large enough to accommodate the photonic device(s). As such, opening 437 would not need to extend to opening 438. In still other alternative embodiments, plates 4 and 6 do not have openings 437 to accommodate for photonic devices attached to an OSA. In these embodiments, the OSA can still be placed into fixture 400 by inserting OSA 402 before placing plate 6, 416 on top of plate 5, 414.

Openings 438 serve to increase the amount of heat energy absorbed by the OSA, CSA, and the connecting solder material by reducing the amount of ceramic plate material surrounding the optoelectronic module. Openings 438 can have any variety of shapes that allows for better heat transfer so long as the openings are not so large that the structural integrity of the plates are compromised. Preferably, openings 438 do not have sharp corners as this would increase the likelihood of cracking of the ceramic material due to thermal expansion and contraction. Actually, any of the plates can have holes to reduce the mass of the plates so to allow for more heat to be absorbed by the optoelectronic module.

Again, exemplary dimensions, in millimeters, are shown in FIG. 9. R0.75 refers to the radius of each of the openings 438. Alignment holes 440 are positioned to align with the alignment holes of the other plates of fixture 400.

In alternative embodiments of the invention, more than two plates can be used to secure OSA 402 on top of CSA 404. For instance, three separate plates can be used. On the other hand, a single plate having sufficient thickness can be used to prevent rotation of OSA 402. Such a plate would be thick enough such that its opening makes contact with a large vertical section of OSA 402 extending around the perimeter of the OSA. The contact in this vertical section can be sufficient to prevent rotation of OSA 402.

Figure 10:
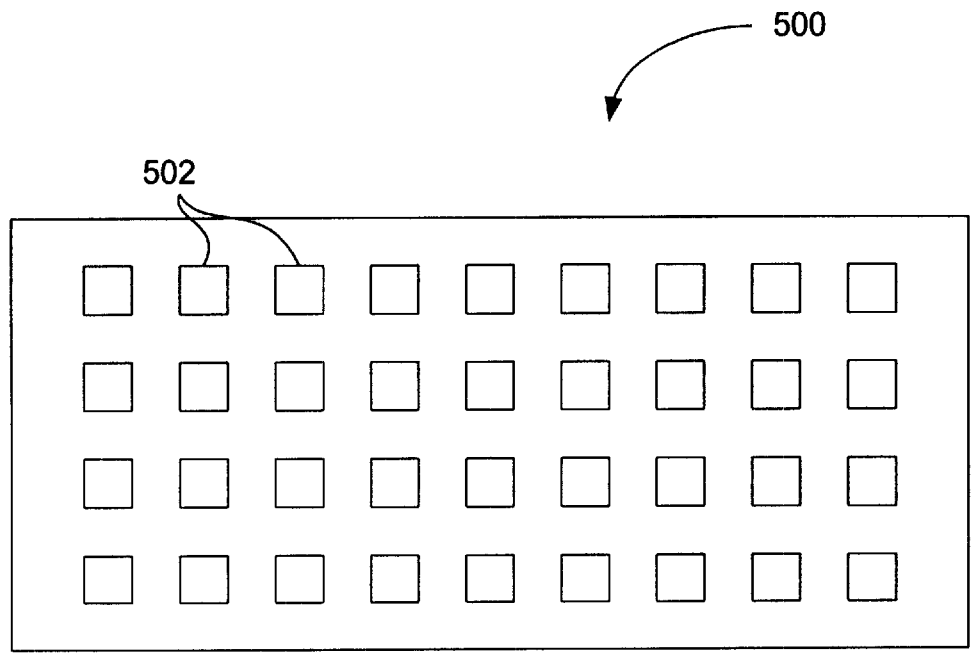
FIG. 10 illustrates a top plan view of a fixture that has an array of openings that are each designed to secure an OSA/CSA combination.

FIG. 10 illustrates a top plan view of a fixture 500 that has an array of openings 502 that are each designed to secure an OSAICSA combination. The use of an array of openings 502 allows fixture 500 to take advantage of economies of scale. To reflow the secured OSA and CSA's, the entire fixture 500 would be placed into a reflow oven. Fixture 500 is formed of stacked plates having a plurality of openings as described in FIGS. 4–9. The visible plate in FIG. 10 is a top plate that secures the OSA's.

In an alternative embodiment, plates 3, 4, 5, and 6, which have an array of openings, can be placed on top of a leadframe panel containing an array of CSA's. In this implementation, plates 1 and 2 would not be used and plates 3–6 would be designed to match the configuration of the CSA's in the leadframe panel.

Figure 11:
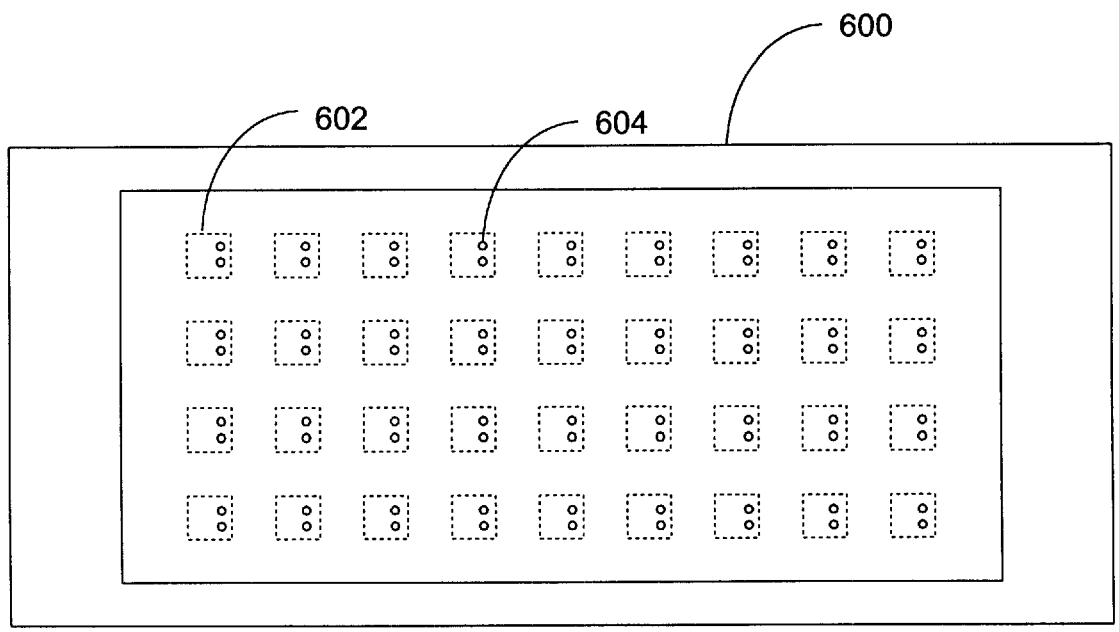
FIG. 11 illustrates a top plan view of a typical leadframe panel containing an array of CSA's.

FIG. 11 illustrates a top plan view of a typical leadframe panel 600 containing an array of CSA's 602. As an example, panel 500 of FIG. 10 can be placed on top of panel 600 of FIG. 11 during a reflow process. Each of CSA 602 contain solder material deposits 604 that are ready to make contact with respective OSA's. To reflow the solder material deposits, the plates are placed on top of panel 600, the OSA's are inserted into the openings of the plates, and then the entire configuration is placed into a reflow oven.

The methodology of using fixture 400 will now be described. OSA 402 and CSA 404 are placed into fixture 400 by first laying down plate 1, 406, laying down plate 2, 408 and then placing CSA 404 within the opening 424 of plate 2, 408. As mentioned earlier, CSA 404 is supported from beneath by plate 1, 406. CSA 404 has pre-formed solder material on its top surface, which will bond CSA 404 to OSA 402.

It should be understood that the specific order of laying down specific plates and inserting the OSA or CSA into the openings can vary and not every permutation of the various orders will be presented. For example, one permutation is first laying down plate 1, 406, then positioning CSA 404 on plate 1, then placing plate 2, 408 so that its opening 424 surrounds the CSA. This order, however, presents a bigger challenge in placing CSA in precisely the right location such that plate 2, 408 would fit around CSA and its alignment holes 426 would align with alignment holes 422 of plate 1, 406.

After CSA 404 is inserted into the opening of plate 2, plate 3, 410 is placed on top of plate 2, 408 such that the alignment holes of plates 1–3 are aligned. Then, plates 4, 5, and 6 are sequentially placed on top of plate 3, 410. OSA 402 is then inserted into the opening 436 of plates 4 and 6. The OSA is oriented so that its photonic device fits within opening 437. Also OSA 402 is oriented so that electrical contacts on its bottom surface make contact with the solder material on the top surface of CSA 404. The stack of plates 1–6 is clamped tightly together to secure the orientation of the OSA and CSA. The combination of the stacked plates, OSA and CSA is then placed into a reflow oven so that the solder material bonds to OSA 402 and CSA 404. After the reflow process, the entire assembly is removed from the oven for cooling. The combination of OSA 402 and CSA 404 can be cooled within fixture 400 or fixture 400 can be removed to facilitate faster cooling.

Typically, underfill is injected into the gap between OSA and CSA's after the solder balls are reflowed. Underfill injection can be performed in three ways. First, underfill can be injected while optoelectronic module is within the fixture if openings within the fixture allow for injection devices to reach the OSA and CSA. Second, the OSA and CSA can be removed from the fixture and then supported by a separate support structure specifically designed for the underfill injection process. And thirdly, underfill can be injected while OSA and CSA module are free-standing without support from the fixture or any other structure.

Figure 12:
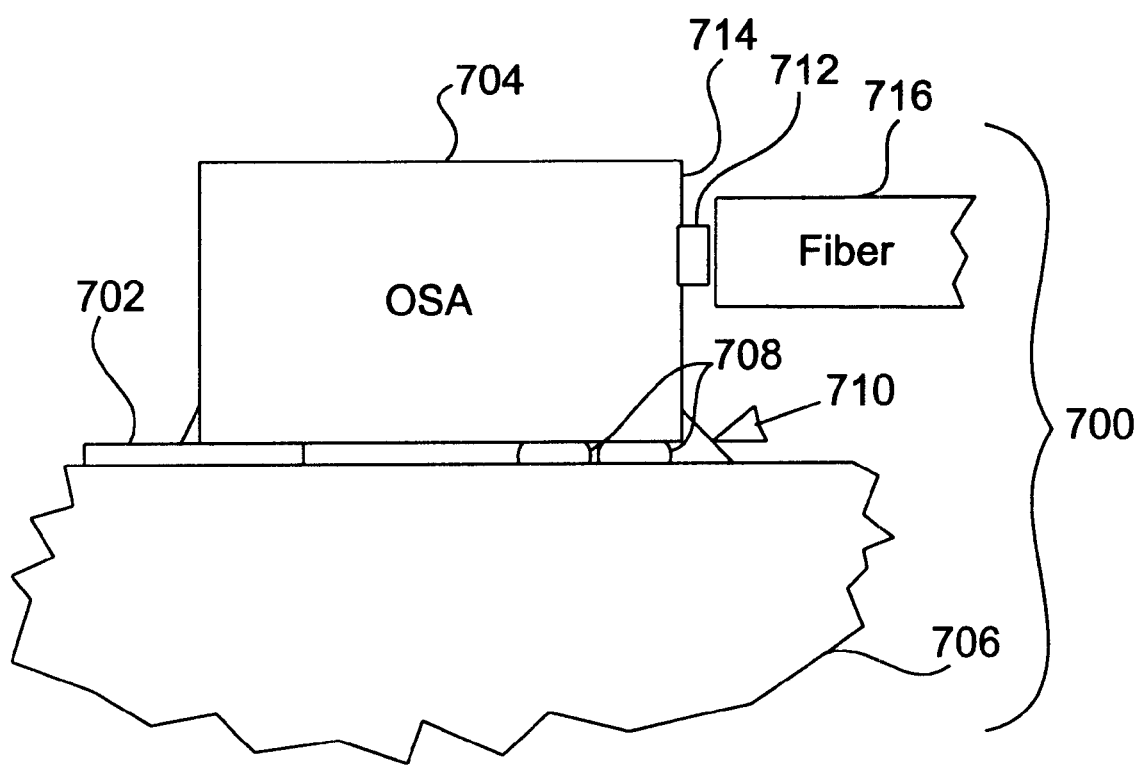
FIG. 12 illustrates a side plan, cut-away, cross-sectional view of an optoelectronic module having a high temperature tape that maintains parallelism between OSA and CSA.

FIG. 12 describes the technique of maintaining parallelism between and OSA and CSA through the use a high-temperature tape. FIG. 12 illustrates a side plan, cut-away, cross-sectional view of an optoelectronic module 700 having a high temperature tape 702 that maintains parallelism between OSA 704 and CSA 706. Two solder material deposits 708 are shown to connect OSA 704 and CSA 706. Underfill material 710 fills the gap between OSA 704 and CSA 706. Underfill 710 enhances adhesion and reliability between the OSA-CSA connection. Photonic device 712 is shown to be mounted onto side surface 714 of OSA 704. Optical fiber 716 is positioned close to the photonic device 712.

High-temperature tape 702 is selected to have a thickness that matches the standoff distance created by solder material deposits 708. Tape 702 supports the end of OSA 704 opposite the end connected to solder deposits 708 and therefore maintains parallelism between OSA 704 and CSA 706 throughout and after the solder reflow process. Ultimately, high-temperature tape 702 becomes a permanent part of the optoeletronic module 700. Tape 702 can have adhesive material on both surfaces so that it adheres to both the CSA and the OSA. However, it is preferable that tape 702 have adhesive material only on the surface that makes contact with CSA 706. In this manner, OSA 704 has the lateral freedom to self-align during the reflow process when solder material 708 melts.

In alternative embodiments, tape 702 can be placed between a greater portion of the interface between the OSA and the CSA such that little open space is left between the components. Typically, tape 702 is formed of polyimide. However, any material that can withstand high temperatures characteristic of reflow processes can be used.

Figure 13:
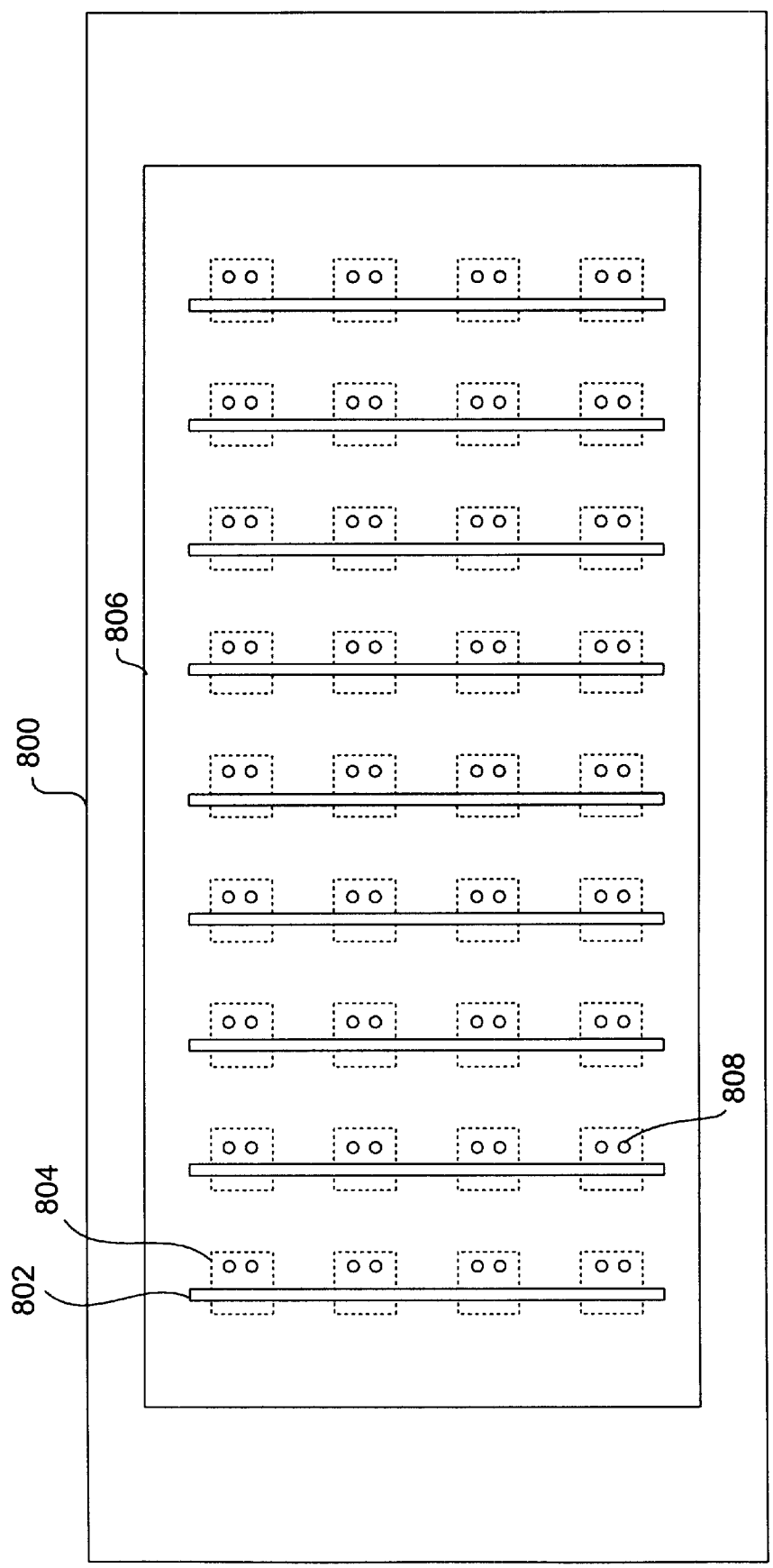
FIG. 13 illustrates a top plan view of a leadless leadframe panel having strips of high temperature tape attached across rows of CSA.

An efficient manner of using high-temperature tape is to apply it to many CSA at one time. This can be done by applying a strip of tape across a row of CSA that are still within a leadframe panel array. This is illustrated in FIG. 13. FIG. 13 illustrates a top plan view of a leadless leadframe panel 800 having strips of high temperature tape 802 attached across rows of CSA 804. The individual CSA 804, demarcated by dashed lines, are set within a molded resin panel 806 and must be singulated to be useful as individual devices. Each of the strips of tape 802 are placed near the end of the CSA 804 opposite the end with the solder material deposits 808. Upon singulation of each of CSA 804, the high temperature tape strips will be severed along with the panel 800.

Figure 14:
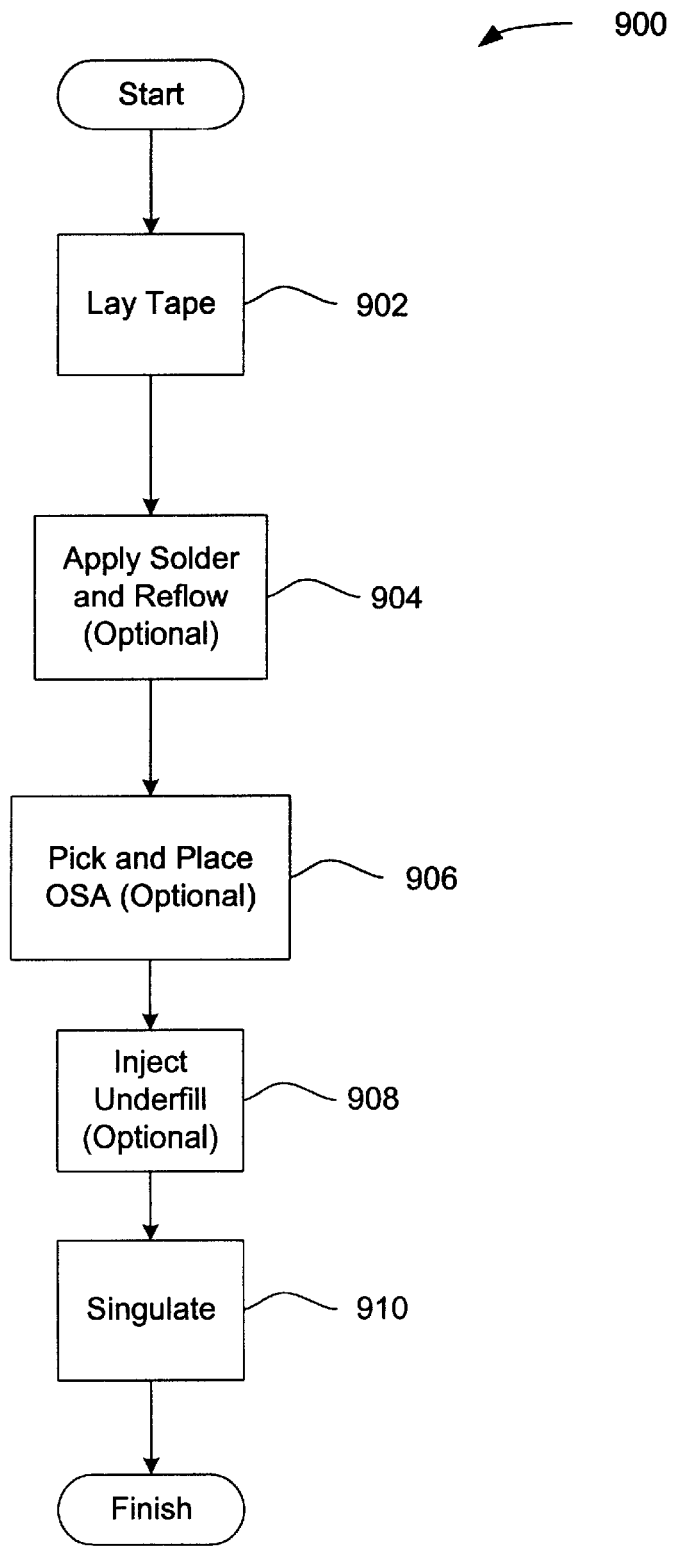
FIG. 14 illustrates a flow diagram of the operations for utilizing high-temperature tape.

A few base-line operations are necessary to use the high-temperature tape to maintain parallelism and a few other operations are optional depending upon what entity along a distribution chain performs certain manufacturing operations. FIG. 14 illustrates a flow diagram 900 of the operations for utilizing high-temperature tape. The base line operations include an initial operation 900 of placing high-temperature tape on the top surface of a CSA or a panel of CSA's. A concluding operation 910 involves singulating, or cutting, a panel of CSA into individual CSA devices.

Other operations can be performed in between these operations or they can be performed after the singulation operation. A first one of these operations includes an operation 904 of applying solder material deposits onto the electrical contact surfaces of either an individual CSA, or more likely, a panel of CSA. Solder material can be applied in a number of convention methods such as screen or stencil printing. The solder is reflowed in operation 904 so that it attaches to the exposed contact surfaces (or bumps) on top of the CSA. These bumps are subsequently coined by a controllable amount to ensure uniform solder ball height within the array. Flux is then applied to the solder balls prior to the pick and placed operation 906.

Another operation 906 involves picking and placing an OSA on top of each of the CSA and solder material deposits, along with a reflow operation to solidify the connection between the components. Yet another operation 908 is that of injecting underfill between the attached OSA and CSA combination.

Figure 15:
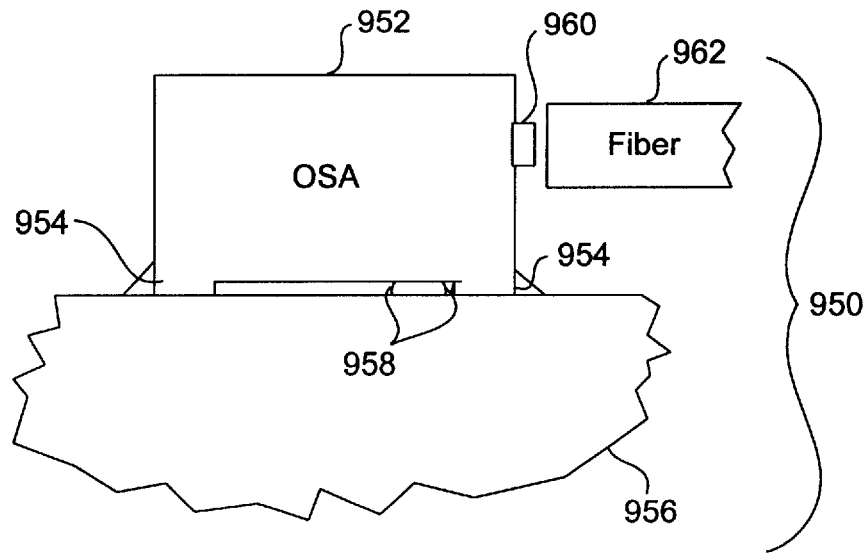
FIG. 15 illustrates a side plan view of an optoelectronic module in which OSA has pedestals on its bottom surface.
Figure 16:
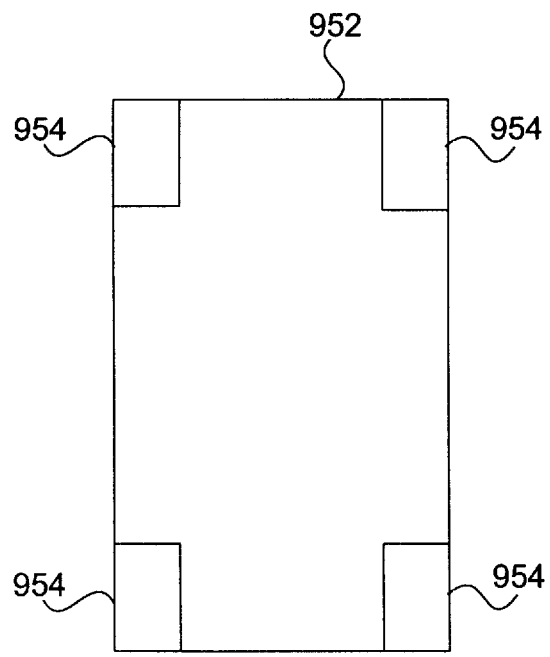
FIG. 16 illustrates a plan view of the bottom surface of the OSA of FIG. 15, in which the arrangement of pedestals is shown.

FIGS. 15 and 16 are now presented to describe another technique for maintaining co-panarlity between a CSA and an OSA. FIG. 15 illustrates a side plan view of an optoelectronic module 950 in which OSA 952 has pedestals 954 on its bottom surface. FIG. 16 illustrates a plan view of the bottom surface of OSA 952 in which the arrangement of pedestals 954 is shown. Pedestals 952 are extensions off of the bottom surface of OSA 952, which support OSA 952 such that its bottom surface is parallel with the top surface of CSA 956.

Pedestals 954 must be formed with precision so that the desired uniform standoff distance between OSA 952 and CSA 956 can be obtained. Uniform standoff distance provides the parallelism that facilitates optimal optical efficiency between the photonic devices 960 and optical fiber 962. Pedestals 954 can be formed during the injection molding process of a ceramic OSA 952 or the molding process of a PEEK OSA. A typical height of a pedestal, measured from the bottom surface of the OSA 052 to its bottom surface, is in the range of 2.5–3 mils (about 65–75 microns).

Preferably, OSA 952 has four pedestals in each corner of its bottom surface for maximum stability. However, in alternative embodiments, pedestals can be formed only at the end of the OSA 952 opposite the solder material deposits 958. Also, instead of having two pedestals at one end of OSA 952, one long pedestal extending along an entire edge of OSA 952 can also be formed.

During manufacturing, flux can be applied on top of CSA 958 to prevent OSA 952 from moving during transit.

While this invention has been described in terms of several preferred embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

We claim:

1. A fixture used during the process of attaching an optical sub-assembly to a chip sub-assembly comprising:

a chip sub-assembly capture plate having a chip sub-assembly slot configured to support and secure the chip sub-assembly in a fixed orientation and having a set of index holes; and an optical sub-assembly capture plate having an optical sub-assembly slot configured to align and maintain the relative orientation between the optical sub-assembly and a chip sub-assembly such that the bottom surface of the optical sub-assembly and the top surface of the chip sub-assembly are substantially parallel, the optical sub-assembly capture plate having a set of index holes that are aligned with the index holes of the chip sub-assembly capture plate.

2. A fixture as recited in claim 1 wherein the chip sub-assembly plate and the optical sub-assembly plate are made of ceramic material and have substantially the same coefficient of thermal expansion.

3. A fixture as recited in claim 1 wherein the chip sub-assembly plate has an opening through which the bottom surface of the chip sub-assembly is exposed and thereby allows for uniform heating of the chip and optical sub-assemblies during a heating process.

4. A fixture as recited in claim 1 wherein the optical sub-assembly plate has at least one layer region that is porous and thereby allows for uniform heating of the chip and optical sub-assemblies during a heating process.

5. A fixture as recited in claim 1 wherein the optical sub-assembly capture plate has at least one ventilation hole proximate to the optical sub-assembly slot, whereby the ventilation hole enhances heat transfer to an optical sub-assembly that is to be secured within the optical sub-assembly capture plate.

6. A fixture as recited in claim 1 wherein the chip sub-assembly capture plate has at least one ventilation hole proximate to the chip sub-assembly slot, whereby the ventilation hole enhances heat transfer to a chip sub-assembly that is to be secured within the chip sub-assembly capture plate.

7. A fixture used during the process of attaching an optical sub-assembly to a chip sub-assembly comprising:

a chip sub-assembly support plate configured to support the chip sub-assembly and having an opening through which the bottom surface of the chip sub-assembly is exposed, thereby allowing for uniform heating of the chip and optical sub-assemblies during a heating process;

a chip sub-assembly securing plate having an opening configured to fit around the perimeter of the chip sub-assembly and thereby fix the orientation of the chip sub-assembly;

a first optical sub-assembly securing plate having an opening configured to fit around the perimeter of the optical sub-assembly; and a second optical sub-assembly securing plate having an opening configured to fit around the perimeter of the optical sub-assembly at a region above the first optical sub-assembly securing plate, wherein the chip sub-assembly support and securing plates and the first and second optical sub-assembly securing plates are attached to each other and serve to align and maintain the relative orientation between the optical and chip sub-assemblies.

8. A fixture as recited in claim 7 further comprising:
a first porous ventilation plate secured between the first optical sub-assembly securing plate and the chip sub-assembly securing plate, the first porous ventilation plate having an opening that fits around the optical sub-assembly, wherein the first porous ventilation plate facilitates uniform heating of the chip and optical sub-assemblies during heating processes.

9. A fixture as recited in claim 8 further comprising:
a second porous ventilation plate secured between the first optical sub-assembly securing plate and the second optical sub-assembly securing plate, the second porous ventilation plate having an opening that fits around the optical sub-assembly, wherein the second porous ventilation plate further facilitates uniform heating of the chip and optical sub-assemblies during heating processes.

10. A fixture as recited in claim 7 wherein the first and second optical sub-assembly securing plates each have at least one ventilation hole proximate to the respective openings, whereby the ventilation hole enhances heat transfer to an optical sub-assembly that is to be secured within the optical sub-assembly securing plate.

11. An optoelectronic manufacturing system comprising:
a molded leadframe panel that includes a metal leadframe panel that supports a molded resin panel, the molded resin panel containing an embedded array of chip sub-assemblies, each of the chip sub-assemblies containing a semiconductor die; and
a fixture panel mounted on top of the molded leadframe panel, whereby the fixture panel is used to mount respective optical sub-assemblies on top of each embedded chip sub-assembly, the fixture panel including
a first optical sub-assembly securing plate having a plurality of openings configured to fit around the perimeter of a respective optical sub-assembly; and
a second optical sub-assembly securing plate having a plurality of openings configured to fit around the perimeter of a respective optical sub-assembly at a region above the first optical sub-assembly securing plate, wherein the first and second optical sub-assembly securing plates are attached to each other and serve to align and maintain the relative orientation between the optical sub-assemblies and the chip sub-assemblies.

12. A method for maintaining the relative orientation between an optical sub-assembly and a chip sub-assembly during an optoelectronic manufacturing process comprising:
providing a chip sub-assembly capture plate having a chip sub-assembly slot;
inserting a chip sub-assembly into the chip sub-assembly slot, the chip sub-assembly slot configured to support and secure the chip sub-assembly in a fixed orientation;
providing an optical sub-assembly capture plate having an optical sub-assembly slot;
inserting an optical sub-assembly into the optical sub-assembly slot, the chip and optical sub-assembly capture plates cooperatively configured to align and maintain the relative orientation between the optical sub-assembly and a chip sub-assembly such that the bottom surface of the optical sub-assembly and the top surface of the chip sub-assembly are substantially parallel; and
placing the combination of the chip and optical sub-assembly capture plates and the chip and optical sub-assemblies into a reflow oven to undergo a reflow process.

13. An optoelectronic module comprising:
a chip sub-assembly including,
a semiconductor die;
at least one up-linking contact connected to a top surface of the semiconductor die;
a molded resin package completely encapsulating the semiconductor die and partially encapsulating the up-linking contact such that an up-linking contact surface of the up-linking contact is exposed through a top surface of the molded resin package;
electrically conductive connective material formed on the up-linking contact surface;
an optical sub-assembly including,
a support block having a side surface and a bottom surface;
at least one photonic device attached to the side surface;
electrical contact pads that are on the bottom surface of the optical sub-assembly and that are placed in contact with the electrically conductive connective material on the chip sub-assembly, wherein the electrical contact pads are connected to the photonic device; and
a high-temperature tape positioned on the top surface of the molded resin package and supporting at least a portion of the bottom surface of the optical sub-assembly such that the bottom surface of the optical sub-assembly and the top surface of the molded resin package are substantially parallel.

14. An optoelectronic module as recited in claim 13 wherein the high-temperature tape is adhesively attached to the top surface of the molded resin package and is in non-adhesive contact with the optical sub-assembly, whereby during a reflow process, the optical sub-assembly can undergo self-aligning movement.

15. An optoelectronic module as recited in claim 13 wherein the up-linking conductive material is solder.

16. An optoelectronic module as recited in claim 13 wherein the high-temperature tape is made of polyimide.

17. A semiconductor leadframe panel comprising:
an electrically conductive substrate having a molded resin panel formed thereon;
an array of semiconductor dice encapsulated within the molded resin panel, the top surface of each semiconductor die supporting at least one up-linking contact such that an up-linking contact surface of each up-linking contact is exposed through a top surface of the molded resin panel, whereby the top surface of the molded resin panel has an array of up-linking contact surfaces arranged in a plurality of rows; and
a plurality of high-temperature tape strips adhered to the top surface of the molded resin panel and positioned adjacent to each row of up-linking contact surfaces.

18. A semiconductor leadframe panel as recited in claim 17 further comprising:
electrically conductive connective material formed on each of the up-linking contact surfaces.

19. A semiconductor leadframe panel as recited in claim 18 further comprising:
a plurality of optical sub-assemblies, each of which are positioned above a respective up-linking contact surface, each optical sub-assembly including,
a support block having a side surface and a bottom surface;
at least one photonic device attached to the side surface; and electrical contact pads that are on the bottom surface of the optical sub-assembly and that are placed in contact with the electrically conductive connective material, wherein the electrical contact pads are connected to the photonic device, wherein each high-temperature tape strip supports at least a portion of the bottom surface of at least one optical sub-assembly such that the bottom surface of each optical sub-assembly and the top surface of the molded resin panel are substantially parallel.

20. A semiconductor leadframe panel as recited in claim 19 wherein each of the high-temperature tape strips are adhesively attached to the top surface of the molded resin panel and is in non-adhesive contact with each of the optical sub-assemblies, whereby during a reflow process, each of the optical sub-assemblies can undergo self-aligning movement.

21. A semiconductor leadframe panel as recited in claim 18 wherein electrically conductive connective material is solder.

22. A semiconductor leadframe panel as recited in claim 17 wherein each of the high-temperature tape strips are made of polyimide.

23. A method for maintaining the relative orientation between optical sub-assemblies and chip sub-assemblies during an optoelectronic manufacturing process comprising:

adhering high-temperature tape strips to a top surface of a molded resin panel adjacent to respective rows of up-linking contact surfaces; and singulating the molded resin panel into individual chip sub-assemblies having a respective up-linking contact surface and a respective portion of a high-temperature tape strip.

24. A method as recited in claim 23 further comprising:

applying electrically conductive connective material onto each of the up-linking contact surfaces before the singulating operation; and reflowing electrically conductive connective material on the molded resin panel by placing the panel in a reflow oven.

25. A method as recited in claim 24 further comprising:

picking and placing optical sub-assemblies onto the top surface of the molded resin panel, before the singulating operation, proximate to respective up-linking contact surfaces such that contact pads of each optical sub-assembly is placed in contact with electrically conductive connective material and one of the high temperature tape strips.

26. An optoelectronic module comprising:

a semiconductor chip sub-assembly having a top surface that includes a plurality of up-linking contact surfaces, a deposit of electrically conductive connective material formed on each of the up-linking contact surfaces; and a support block having a bottom surface and a side surface, the support block having a set of electrical traces that extend from the bottom surface to the side surface, the bottom surface of the support block mounted onto the top surface of the chip sub-assembly such that the electrical traces are connected to the up-linking contact surfaces, at least one pedestal extending from the bottom surface of the support block and making contact with the top surface of the chip sub-assembly, the pedestal configured to support the support block in an orientation in which the bottom surface of the support block is substantially parallel with the top surface of the chip sub-assembly; and a photonic device mounted on the side surface of the support block, the photonic device having at least one active facet thereon and having a plurality of contacts that are electrically coupled to the electrical traces on the support block.

27. An optoelectronic module as recited in claim 26 wherein there are four pedestals extending from the bottom surface of the support block, the pedestals being arranged in a rectangular formation wherein each pedestal is positioned at a corner of the rectangular formation.

28. An optoelectronic module as recited in claim 26 wherein the support block is formed of ceramic.

29. An optoelectronic module as recited in claim 26 wherein the electrical traces on the bottom surface of the support block makes contact with the electrically conductive connective material at a first end of the support block and at least one pedestal is located at a second end of the support block that is on an opposite end of the support block from the first end.

* * * * *